[11] 3,580,058

[72] Inventor Lawrence
         Waltham, Mass.
[21] Appl. No. 730,713
[22] Filed May 21, 1968
[45] Patented May 25, 1971
[73] Assignee Panametrics, Inc.
         New York, N.Y.

[54] DUAL ULTRASONIC SENSORS EMPLOYING A SINGLE MODE OF ULTRASONIC TRANSMISSION
     13 Claims, 9 Drawing Figs.
[52] U.S. Cl. .................................................... 73/67.7
[51] Int. Cl. .............................................. G01n 29/00
[50] Field of Search .................................... 73/67.7,
                                                          67.5, 67.8, 67.2

[56]                  References Cited
              UNITED STATES PATENTS
3,273,146   9/1966   Hurwitz, Jr. ................... 73/67.8
3,350,942   11/1967  Peltola ........................... 73/67.8
                   FOREIGN PATENTS
288,629     3/1965   Netherlands ................... 73/67.7

_____ueisser
Assistant Examiner—Arthur E. Korkosz
Attorney—Kenway, Jenney and Hildreth ABSTRACT: An ultrasonic measuring system for determining ambient conditions on two sensing elements. The elements may be positioned either to respond to a distribution in space of one ambient condition or to respond to two different ambient conditions in the same area. An ultrasonic transducer produces waves in only one ultrasonic mode, which are coupled to two sensors by means of a single lead-in element. The relative acoustic impedances of the sensors and their dimensions in a direction of propagation of the ultrasonic waves are such that the reflection pulses generated at each end of each of the sensors are identifiable with those ends of the sensors based upon their distribution in time, or their polarity or both. These dimensions and relative impedances are controlled so that reverberation pulses do not create an ambiguity and the identification of the primary marking pulses are generated at each end of the sensors.

INVENTOR
LAWRENCE C. LYNNWORTH
BY
Kenway, Jenney & Hildreth
ATTORNEYS

INVENTOR
LAWRENCE C. LYNNWORTH
BY
Kenway, Jenney & Hildreth
ATTORNEYS

INVENTOR
LAWRENCE C. LYNNWORTH 3,580,058

DUAL ULTRASONIC SENSORS EMPLOYING A SINGLE MODE OF ULTRASONIC TRANSMISSION

FIELD OF THE INVENTION

This invention relates in general to ultrasonic measurement and more particularly to a system for measuring ultrasonic transmission characteristics within two juxtaposed closely spaced sensing elements to determine ambient conditions at the two sensors.

Measurement of changes in ultrasonic transmission characteristics as indicative of change in ambient conditions which affect those characteristics is well known in the art. Most such measurements employ an instrument which includes an ultrasonic transducer coupled to a sensing element which includes an acoustic discontinuity for producing a reflected ultrasonic pulse. Either the time difference or the amplitude difference between the initial pulse and the reflected pulse is then used as a measure of the ultrasonic transmission characteristics of the material. Changes in these ultrasonic transmission characteristics are then taken as indicative of changes in the ambient condition. Typically such a device has been used to measure changes in temperature in the medium surrounding the sensor. There are, however, a number of situations in which it is desirable to measure not the temperature at one point but the distribution of temperature within some medium. In such circumstances, it is often inconvenient to include a number of probe assemblies because of problems arising from limited access to the medium and the necessity of minimal disturbance of the medium.

SUMMARY OF THE INVENTION

Broadly speaking the ultrasonic measurement system of this invention employs an ultrasonic wave generating transducer for generating pulses in one mode, a lead-in member and two or more sensor elements acoustically coupled in sequence to the lead-in member and the ultrasonic generator. The sensors may be actually different elements or may be formed of one material employing differences in shape to produce acoustic discontinuities separating the elements. The ultrasonic generator is generally in the form of a transducer which acts both as a generator and receiver, however, a separate receiving transducer may be employed in some instances. The acoustic impedance for the particular mode and the longitudinal dimension along the direction of extension of the sensors are arranged so that the interfaces between the lead-in member and the first sensor and between each of the following sensors presents acoustic mismatches generating reflection pulses, the time or amplitude difference between successive reflection pulses serving as an indication of the transmission characteristics of the sensor between the interfaces. The length of the sensor and the direction of change of impedance from one side of each interface to the other are arranged so the interface "marking" pulses may be distinguished from any reverberation pulses on either a time or polarity basis or both. By providing for identification of the pulses as marking particular interfaces, the characteristics may then serve as an indication of the changes in ambient conditions as a function of distance along the sensor.

DESCRIPTION OF PREFERRED EMBODIMENTS

Figure 1:
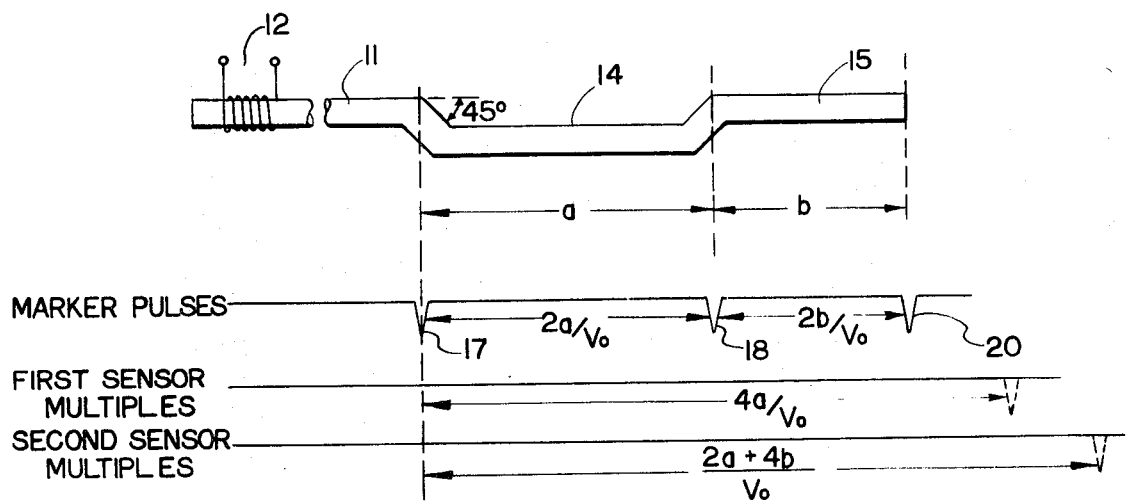
FIG. 1 is a perspective view of a sensor probe constructed in accordance with the principles of this invention including waveform diagrams.

With reference to FIG. 1, there is shown a sensor probe assembly including a lead-in element 11, a transducer coil 12, a first sensor section 14 and a second sensor section 15. This sensor probe assembly is formed of a solid cylindrical rod and, as illustrated, the first sensor 14, which has a length $a$, is set off from the lead-in member 11 by a 45° offset and from the second sensor by a somewhat larger angle, for example 60°. The purpose of the assembly is, as above-described, to obtain separate measurements of the transmission characteristics of the two sensors 14 and 15 in order to obtain a profile of some ambient condition along the length of this probe. One such usual ambient condition to be measured is temperature. This measurement is obtained by exciting the coil 12 to produce an ultrasonic pulse in the extensional mode, which is then transmitted along the lead-in member 11 toward the sensors 14 and 15. By creating acoustic mismatches at the beginning and end of each of the sensors, "marker" pulses are generated from the reflections and either the time difference between these marker pulses or the amplitude difference may be used as a basis for indicating the ultrasonic transmission characteristic of the individual sensor.

The extensional wave impedance for a section of material may be expressed as:

$Z_{extensional} = \rho V_o A$ where $\rho$ = density
$V_o$ = extensional wave velocity
$A$ = cross-sectional area The reflection coefficient at the interface between two sections of differing impedance is, $$R = \frac{Z_2 - Z_1}{Z_2 + Z_1}$$

where $Z_1$ = acoustic impedance of first section
and $Z_2$ = acoustic impedance of second section From these expressions, it can be seen that the magnitude of the reflection pulse at any interface depends upon the ratio value $Z_2/Z_1$ between the impedances on either side of the interface, while the polarity of the reflection pulse depends upon whether $Z_2/Z_1$ is greater than or less than one. Thus, where the impedance of the first element is larger than the impedance of the second, a phase reversal occurs and the polarity of the reflected pulse is opposite that of the originally transmitted pulse. Conversely when the impedance of the second element is larger than the impedance of the first element there is no phase reversal and the polarity of the reflected pulse is the same as that of the originally transmitted pulse.

With reference again to the embodiment of FIG. 1, the 45° offset between the lead-in element 11 and the first section 14 appears, to an acoustic pulse transmitted along lead-in 11, as a decrease in the extensional impedance, since the effective cross-sectional area A is decreased. Similarly, the angular offset between the first sensor 14 and the second sensor 15 appears as a decrease in impedance for the same reason. The end of the sensor 15, under normal conditions such as operation in a vacuum or a fluid, also represents a decrease in impedance. If a positive extensional acoustic pulse is generated in the lead-in element 11 and propagated in the direction in which sensors 14 and 15 extend, then the primary reflection pulses, designated "marker" pulses, will occur as illustrated in the solid line waveform diagram of FIG. 1. In this waveform the marker pulses are shown on a time base referenced to the time of receipt at transducer 12 of the first marker pulse. The first primary reflection pulse 17, at the interface between lead-in 11 and sensor 14, and the second primary reflection pulse 18, occurring at the interface between sensors 14 and 15, provide a basis for determining the transmission characteristic of sensor 14. The reflection pulse 18 and the reflection 20, which occurs at the terminal end of sensor 15 may then serve as a basis for determining the transmission characteristics of sensor 15.

In order to perform this measurement these pulses must be capable of being identified as the primary reflections at these interfaces. Thus, the sensors must be formed with appropriate dimensions so that circuitry operating on the output of the transducer 12 may electrically isolate these pulses from any reverberations, that is, multiple pulses. One source of multiple pulses are those which arise within the sensor 14 characterized by a period of $2a/V_o$. The primary reflection pulse 18, (which is negative in polarity) as it returns along the sensor 14 and reaches the interface between sensor 14 and 11, is affected by the reflection coefficient at this interface, which is negative due to the angular offset. A portion of the primary reflection pulse 18 is transmitted through the lead-in 11 to the transducer 12 and a portion is reflected, with a phase reversal, back along the sensor 14 in the direction of sensor 15, thereby forming a positive polarity reverberation pulse. The reverberation pulse, upon reaching the interface between sensor 14 and 15 is again partially reflected with a phase reversal thereby becoming negative and this negative reflected portion is transmitted, in part, back through the interface between 11 and 14 to the transducer 12.

Because of the two-way negative reflection coefficients introduced by the angular offsets, only negative reflection pulses can be transmitted to the transducer 12 and it is the second reflection at the interface between sensors 14 and 15 which produces this first negative reverberation pulse. This second reflection occurs at a time $2a/V_o$ after the primary reflection occurred at this same interface, and, as indicated by the dotted line pulse in the waveform this initial reverberation pulse from sensor 14 occurs at a time $4a/V_o$ after the initial reflection pulse 17. While the two-way negative reflection coefficient in FIG. 1 result from the angular offsets, it should be noted that other configurations may also produce this result. One such configuration is to notch the solid rod, thus creating such a two-way negative discontinuity.

A reverberation pulse in sensor 15 is generated as a result of the reflection coefficient seen by the primary reflection pulse 20, as it reaches this interface between sensor 15 and sensor 14. Since this interface has a negative reflection coefficient, phase reversal occurs and a first positive reflection is transmitted back along sensor 15 towards its terminal end. The reflection occurring at the terminal end is again a phase reversing one and the first reverberation pulse from sensor 15 will be received by the transducer 12 at a period $2b/V_o$ after the primary reflection pulse 20 from this sensor. Thus, the total time lapse between the initial marking pulse 17 and the first multiple pulse from sensor 15 received at transducer 12 is $$\frac{2a+4b}{V_0}.$$

In order to assure that these reverberation pulses do not interfere with the identification of the primary reflection pulses, the length $b$ of the sensor 15 should be substantially less than the length $a$ of the sensor 14. The degree of difference in length must be greater than any expected degree of difference in acoustic transmission characteristics between these two sections. If the dimensions are so limited, then the first three negative pulses received by the transducer 12 will be the marker pulses which are to serve as the basis of measurement. For purposes of clarity the pulses are treated as a single pulse of one cycle. In fact, the generated pulses will usually have a precursor and overshoot of smaller amplitude. While the response circuitry can eliminate these portions the lengths $a$ and $b$ must be sufficiently different to avoid overlap of these portions of the pulses.

Figure 2:
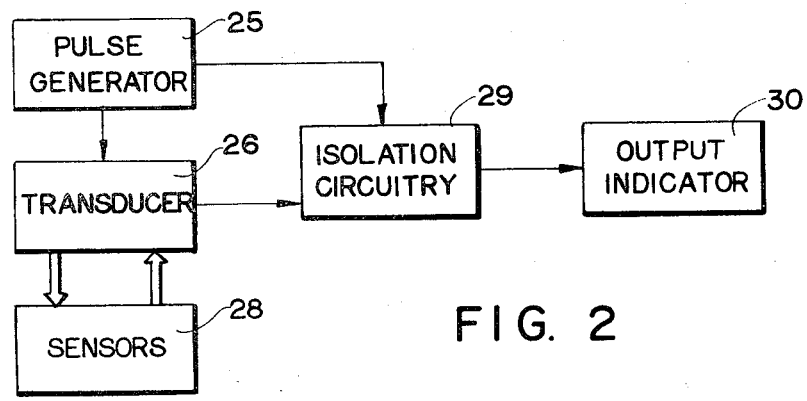
FIG. 2 is an illustration in block diagrammatic form of an ultrasonic measurement system for use in the practice of this invention.

In FIG. 2 a general block diagram for a complete ultrasonic measurement system for use with a probe, such as is illustrated in FIG. 1, is shown. A pulse generator 25 provides actuating pulses to the transducer 26. Transducer 26 may be formed of either a magnetostrictive transducer or a piezoelectric transducer which produces output acoustic waves in response to the exciting pulse from generator 25. This transducer should produce waves primarily in one mode, e.g. either extensional or torsional or some other mode and should respond to received pulses in this mode by producing output electrical signals on its terminals. In magnetostrictive transducers, a Weidemann effect or a Scarrott-Naylor transducer produces only torsional waves, while a Joule transducer produces only extensional waves. In most instances, a single unit will serve as both the ultrasonic wave generator portion of the transducer and the receiving portion, however, the element for generating the ultrasonic waves may be separate from the element for receiving them.

The acoustic pulse from the transducer 26 is applied to the sensors 28 and the reflected pulses from the sensors 28 are received by the transducer 26, converted into electrical output signals which are applied to isolation circuitry 29. The isolation circuitry 29 also receives signals from pulse generator 25 which serves to initiate a time base in that circuitry corresponding to the initiation of the ultrasonic pulse from the transducer 26. An output indicator 30 receives signals from the isolation circuitry indicative of the difference, either in amplitude or time between the pairs of pulses and thus indicative of the separate transmission characteristics of each of the sensors. The exact form of the isolation circuitry 29 will depend upon the basis of identification of the reflection pulses from sensor 14 from the first and second sensors. In the example illustrated above, this circuitry has only to perform the function of recognizing the first three negative pulses following the initiating pulse from the generator 25. Completely conventional circuitry may of course be used to perform this function and to measure the time or amplitude difference between these pulses. In some of the other embodiments illustrated, the isolation circuitry may recognize the primary pulses on the basis of polarity as well as time, for example, recognizing a sequence of one positive pulse followed by two negative pulses. Similarly, circuitry may be required to identify first, a negative pulse after the initiating pulse, then the first positive pulse following that negative pulse, and again the first negative pulse following this intermediate positive pulse. Again, completely conventional circuitry may be utilized to make such identification.

Figure 3:
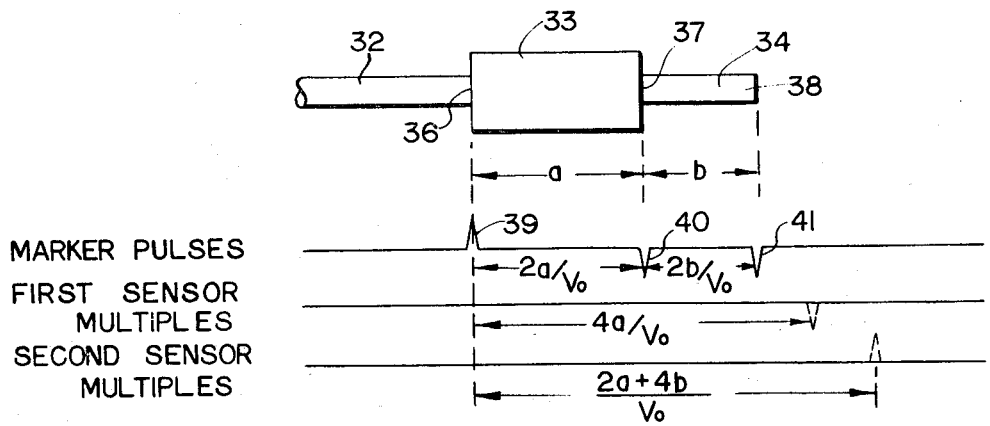
FIG. 3 is an illustration in perspective view of a second embodiment of a measuring probe constructed in accordance with the principles of this invention.

A second configuration of a sensor probe assembly and its accompanying waveforms is illustrated in FIG. 3. In the illustration in FIG. 3 only a portion of the lead-in element 32 is shown, however, it should be understood that a transducer for generating and receiving the extensional wave pulses is located at the end of the lead-in element 32 in a similar position to transducer 12 in the embodiment of FIG. 1. The lead-in element 32 is acoustically coupled to a larger impedance solid round cylindrical member 33 which forms the first sensor and the other end of this first sensor 33 is acoustically coupled to another reduced impedance round cylindrical section 34. An extensional wave pulse transmitted along the lead-in 32 in the direction of extension of the sensors 33 and 34, generates a positive primary reflection at the first interface 36 due to the increased impedance of the first sensor over that of the lead-in element 32. The second primary reflection occurs at the interface 37 between the first sensor 33 and the second sensor 34 and, since there is a decrease in impedance at the interface, a phase reversal occurs and this second primary reflection pulse is negative. The third primary reflection pulse occurs at the terminal point 38 of the second sensor 34 and the reflection coefficient at this terminal is also negative, producing a phase reversal with the result that the reflection pulse 41 is negative.

The reverberation pulses from this probe assembly are also illustrated in FIG. 3. The first reverberation pulse from sensor 33 arises when reflection pulse 40, which is negative, is transmitted back towards interface 36 and a portion of this pulse undergoes a phase reversing reflection at this interface, the remainder of the negative pulse passing along to the transducer. This first multiple reflection pulse is positive at the time it originates at interface 36 is transmitted back along the direction of extension of the probe assembly until it is reflected from interface 37, again in a phase reversing reflection. It then returns as a negative pulse along sensor 33 and the lead-in element 32 to the transducer. This negative reverberation pulse originates at the interface 37 a period $2a/V_o$ after the second primary marker pulse 40 and hence occurs as a negative pulse a period of $4a/V_o$ after the initial marker pulse 39. The reverberation pulses in the sensor 34 result from the reflection at interface 37 of the primary marker pulse 41. At this interface, a portion of the reflection pulse 41 is transmitted back to the transducer and the remainder is reflected in a nonphase reversing reflection back along the sensor 34 until it is reflected in a phase reversing reflection at the terminal end 38. Since the original marker pulse 41 was negative and since the reflection at interface 37 was nonreversing, this reflection, as it leaves the end 38, is positive and occurs at a period $2b/V_o$ after negative pulse 41 originated. Thus, this first reverberation pulse from sensor 34 occurs at a period $$\frac{2a+4b}{V_0}$$

after the initial marking pulse 39.

Since the first multiple from sensor 33 is of the same polarity as the third primary marker pulse 41, then, in order to distinguish clearly the primary marker pulses from multiples, $$\frac{4a}{V_0} > \frac{2a+2b}{V_0}$$

and thus the dimension $a$ of the first sensor 33 must be greater than the dimension $b$ of sensor 34 and again this difference must be greater than the expected variation in transmission characteristic between these two locations.

Figure 4:
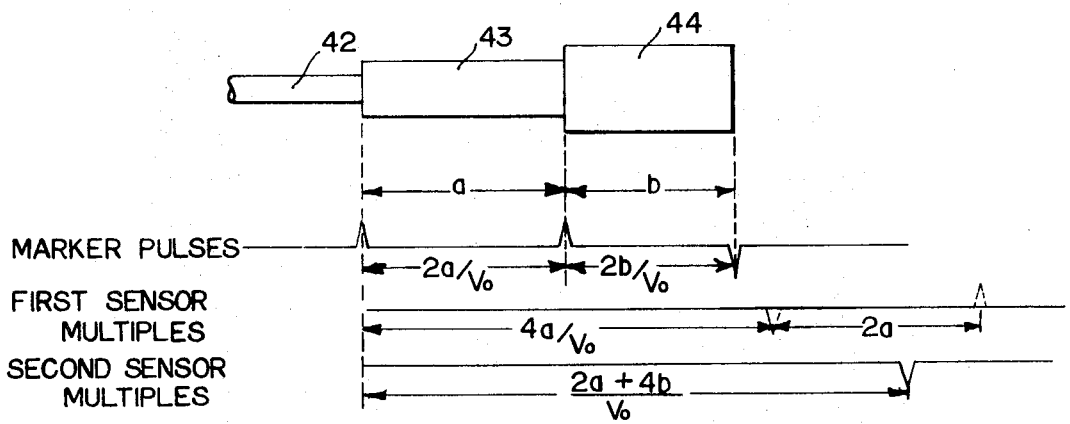
FIGS. 4, 5, 6, 7, 8 and 9 are further embodiments of sensor probes constructed in accordance with the principles of this invention and including appropriate waveform diagrams.

In the embodiment illustrated in FIG. 4, the marker pulse sequence is a positive pulse followed by a positive pulse followed by a negative pulse. The first occurring reverberation pulse from the first sensor 43 is negative and occurs a period $4a/V_o$, after the initial marker pulse. In order that the third marker pulse, which is negative, be identifiable, it must occur prior to this negative reverberation pulse and hence, $$4a/V_0 > \frac{2a+2b}{V_0}$$

Therefore, again in this embodiment, dimension $b$ should be significiantly less than dimension $a$.

Figure 5:
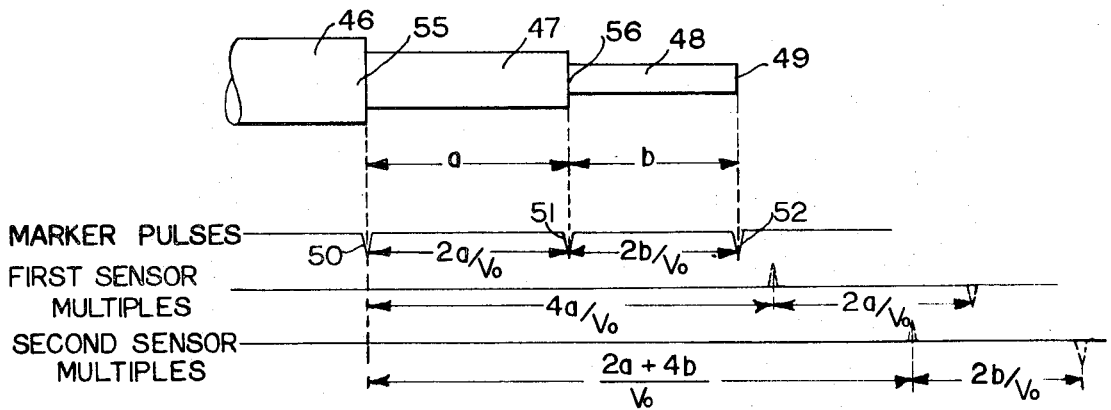

In the probe assembly of FIG. 5, a lead-in element 46 is acoustically coupled to the first sensor 47, with the latter having a smaller acoustic extensional wave impedance than the lead-in element and the second sensor 48, which has a smaller acoustic impedance than the first sensor 47, is coupled directly to the first sensor 47. In this configuration, the primary marker pulses occurring at the two interfaces and at the terminal point 49 of the probe are all negative. The first reverberation pulse from sensor 47 is a multiple of the second marker pulse 51 and occurs at a period $4a/V_o$ after the first marker pulse 50. As in the other instances, this multiple must undergo a reflection at interface 55 between the lead-in 46 and first sensor 47 and a second reflection at the interface 56 between the first sensor 47 and the second sensor 48. Since the first of these reflections is a nonphase reversing one and the second reflection is a phase reversing one, the polarity of this first reverberation pulse is opposite to that of the originating marker pulse 51 and is therefore positive.

The second reverberation pulse from this first sensor 47 occurs a period $2a/V_o$ after the first reverberation pulse and, since it also undergoes the same two reflections, it is reversed in polarity from the first reverberation pulse and is therefore negative. Because the marker pulses are all negative, the positive reverberation pulse resulting from the first multiple can be polarity distinguished from the marker pulses and hence the first occurring reverberation pulse which requires time discrimination is that which occurs at a period $6a/V_o$ after the initial marker pulse 50. One limitation on the length $b$ of the second sensor 48 arises then from the requirement that $2a+2b < 6a$, or $2b < 4a$ or $b < 2a$. The limitation on the dimensions in the embodiment in FIG. 5 differs from that of the earlier embodiments in that $b$ can in fact be longer than $a$, provided that it is enough less than twice $a$, so that variations in velocity within the range of ambient conditions expected would not result in any time ambiguity between the first negative reverberation pulse and the third marker pulse.

Figure 6:
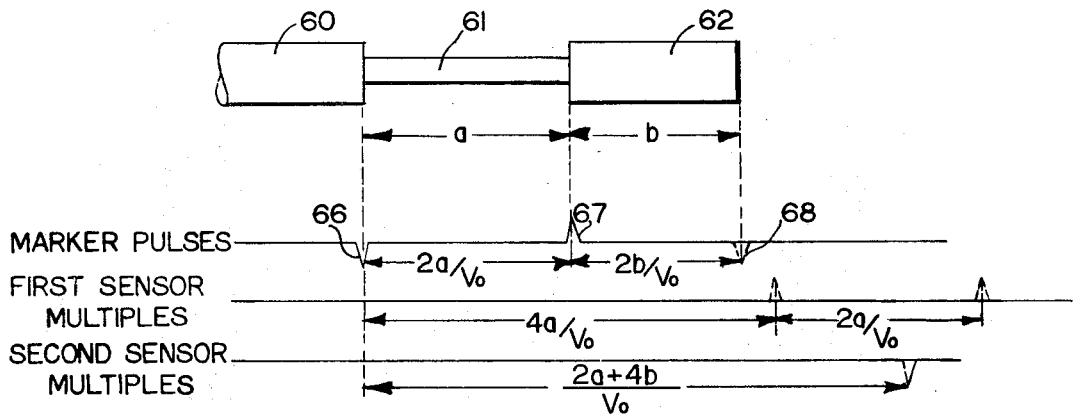

In the embodiment illustrated in FIG. 6, the extensional wave impedance for the first sensor 61 is smaller than that of the lead-in element 60 and also is smaller than that of the second sensor 62. Under these circumstances, the primary pulses from the interfaces at either end of the first sensor and from the terminal end of the second sensor 62 follow a sequence of negative-positive-negative. The first reverberation pulse from the sensor 61 is positive and occurs at a period $4a/V_o$ after the first marker pulse 66. Since the second marker pulse 67 occurs, by definition, in half of this period, there is no possibility of ambiguity between the first reverberation pulse and the second marker pulse 67. Since the third marker pulse 68 is negative, it can be polarity distinguished from this first reverberation pulse. Each of the remaining reverberation pulses from the first sensor 61, must also be positive since there is no phase reversing reflection possible within this sensor. Thus, the reverberations within this sensor impose no limitation on the relative dimensions between the first sensor 61 and the second sensor 62.

The first negative reverberation pulse appearing in the system is that generated as a result of a multiple reflection of the third marker pulse 68. This reverberation pulse will be negative and occurs at a period $$\frac{2a+4b}{V_0}$$

after the initial marking pulse 66. Since this period, again by definition, cannot occur until after the third marker pulse 68 has occurred it cannot be confused with the primary marking pulses. In this embodiment, then, the sequence of direction of the extensional wave impedance mismatches alone provides for nonambiguous identification of the primary reflection pulses.

Figure 7:
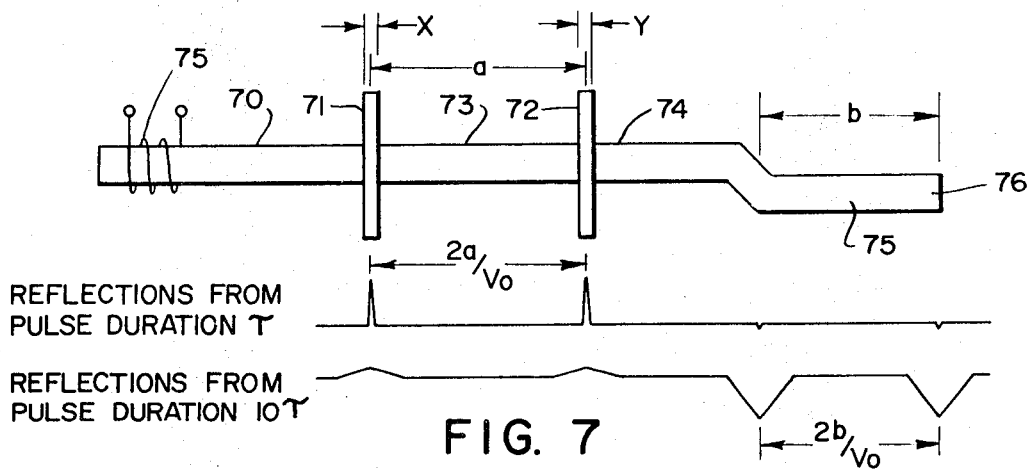

The sensor assembly illustrated in FIG. 7 is used in conjunction with a pulse generator which provides two separate pulses in a known sequence to the transducer 75 for exciting the acoustic pulses. The two exciting pulses are characterized by different time durations so that the wavelength of the ultrasonic energy from one pulse differs from that in the other by about a factor of 10. Thus, the short duration acoustic pulse might typically have a period $\tau$ while the longer pulse may have a period $10\tau$, or longer. The probe assembly in FIG. 7 includes a lead-in element 70 to which is fastened a disc 71 and a disc 72. While one coil 75, as shown may be used, in most instances separate coils of lengths matched to the pulse durations would be employed.

The first disc 71 has a thickness X, while the second disc 72 has a thickness Y which is somewhat larger than the thickness X. The first sensor, in this configuration, is formed of the two discs 71 and 72 and the intermediate section 73 of the round cylindrical rod. An extension 75 of the rod offset by about 45° serves as the second sensor and this offset appears to waves transmitted along the intermediate rod section 74 as a smaller impedance.

For a single cycle pulse, the thickness X and the thickness Y are made approximately equal to about one one-hundredth the wavelength produced by the short exciting pulse having a duration $\tau$. The impedance presented to extensional waves by the discs 71 and 72 is largely controlled by their thickness and characteristic impedance and the number of cycles in the pulses. When it is desired to have the reflection pulses of about equal amplitude, the thickness Y of the second disc 72 is made somewhat larger than the thickness X of the first disc 71. The dimension $b$ of the second sensor 75 is made substantially longer than the wavelength resulting from the $\tau$ duration pulse, generally somewhat in excess of a factor of 10 longer. When the transducer 75 is excited with the $\tau$ duration pulse, it produces an extensional wave pulse characterized by a wavelength about 100 times greater than the dimensions X and Y and hence the discs 71 and 72 produce substantial reflections which serve as a basis for determining the ultrasonic transmission characteristics of the first sensor 73. In those instances where the generated acoustic pulse includes several cycles, the appropriate values for dimensions X and Y are typically one-tenth to one-half the wavelength for the short duration pulse.

If the impedance mismatch is made sufficiently large, for example, producing an energy reflection coefficient of 30 to 40 percent at the disc 71 and an energy reflection coefficient of about 90 percent at the disc 72, then virtually all of the acoustic energy will be reflected from these two discontinuities and no substantial reflection pulse will be generated by the second sensor 75 in response to this exciting pulse. With reflection coefficients of these values the two reflected pulses received by the transducer 75 would be approximately equal in amplitude, neglecting attenuation effects.

If a second exciting pulse having a duration of $10\,\tau$, or larger, is generated separately from this first exciting pulse, the discontinuities at discs 71 and 72 do not produce any significant reflections, since these thicknesses are very small compared to the wavelength, and hence most of the energy in this second acoustic pulse is transmitted to the second sensor 75. The mismatch of impedance between the intermediate section 74 and the second sensor 75 produces a first reflection pulse and, of course, the acoustic discontinuity at the terminal point 76 of the second sensor 75 produces a second reflection pulse. A comparison between these two reflection pulses then provides a basis for determining the ultrasonic transmission characteristics of the second sensor 75. It should be noted that in this configuration it is possible to transmit virtually all of the acoustic energy from the second pulse to the second sensing element 75. Since the exciting pulses for the two sensors differ, there is no problem of confusion of the reflection pulses from the two different sensors. In this case, it is the duration of the exciting pulse which enables identification of a pair of reflection pulses with a specific sensor.

Figure 8:
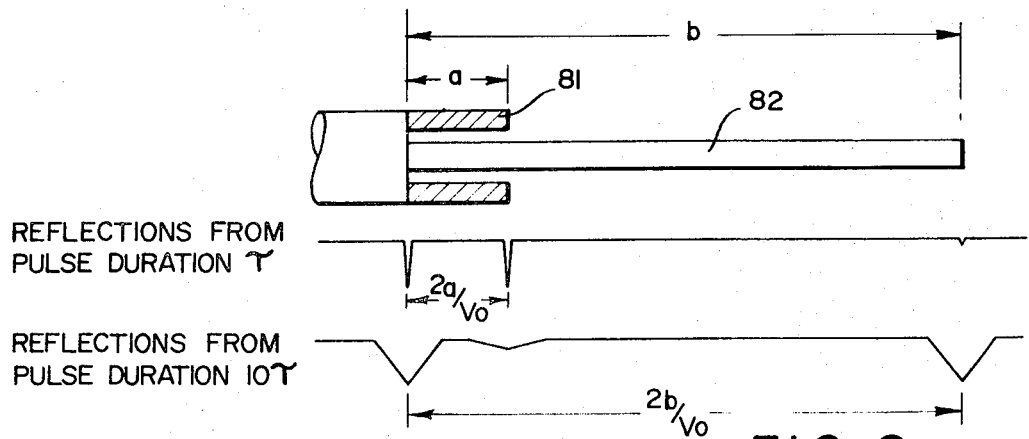

The embodiment shown in FIG. 8 relies, in a similar fashion to that of FIG. 7 on two different duration exciting pulses. In this instance, however, the sensors 81 and 82 are not spaced in sequence along the direction of propagation of the ultrasonic waves. Rather they are radially displaced from one another, sensor 81 being a tube attached to and acoustically coupled to the lead-in element 80, while the second sensor 82 is a round cylindrical rod extending from the lead-in 80 at the same point. The dimension $a$ of sensor 81 along the direction of propagation of the acoustic wave is made about equal to the wavelength of the ultrasonic wave generated by an exciting pulse of time duration $\tau$ while the dimension $b$ of the second sensor 82 in this same direction is made substantially greater, typically a factor of 10 greater than the wavelength for this short duration pulse. A second exciting pulse having a wavelength much greater than the $\tau$ duration pulse is separately generated in the transducer and, as in the embodiment of FIG. 7, the short duration pulse produces reflections from both the interface and the terminal point of sensor 81, while the long duration pulse is not affected by the acoustic discontinuity of sensor 81 to any significant degree and the major reflections are therefore from the sensor 82.

In the sensor described in FIG. 8, the radial distribution of an ambient condition, such as temperature can be measured, or by using different materials sensitive in turn to different ambient conditions, two conditions such as temperature and nuclear flux can be measured. Thus, if the sensor 81 were formed of copper, which is sensitive to both temperature and nuclear flux and the sensor 82 is formed of aluminum, sensitive mainly to temperature, both conditions may be determined.

Figure 9:
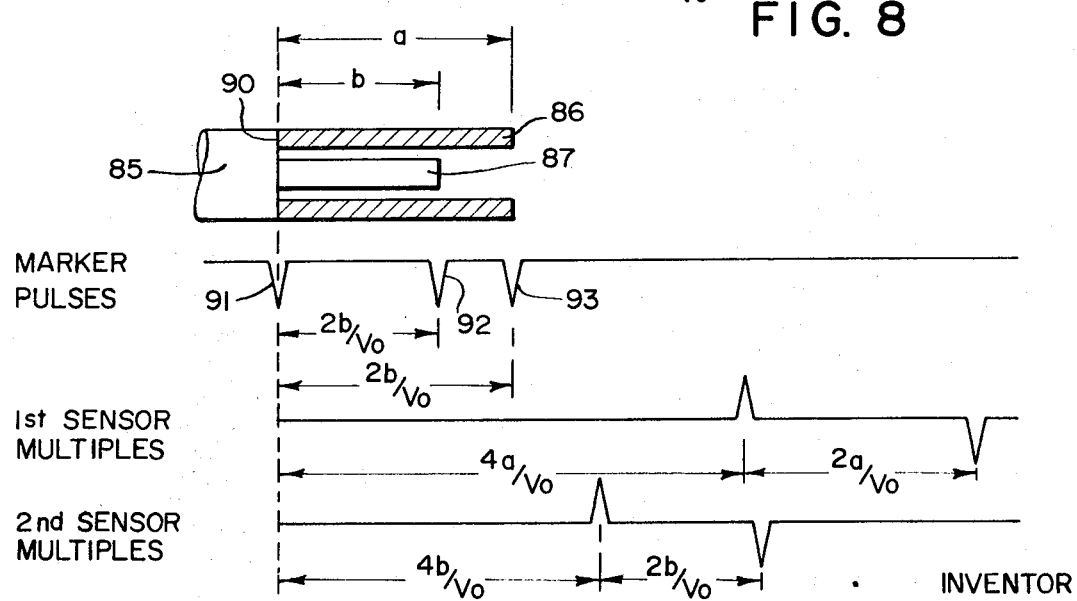

In the embodiment illustrated in FIG. 9, the lead-in element 85 has attached to it at interface 90 a tubular sensor element 86 of length $a$, and, mounted concentrically within this tubular element 86, a solid circular rod 87 of length $b$. The tubular element 86 serves as the first sensor, while the rod 87 serves as the second sensor. The difference in length between $a$ and $b$ must be greater than $V_o\tau/2$, where $\tau$ is the duration of the exciting pulse. While, in the illustration of FIG. 9, the dimension $a$ is shown as greater than the dimension $b$, the assembly will work equally well if dimension $b$ is longer than dimension $a$, again by at least this critical amount. As illustrated in the waveform diagram, the marker pulses which serve as the basis for determining the transmission characteristics of the sensor 87 are the first and second marker pulses designated 91 and 92. These two marker pulses are separated by a time $2b/V_o$. The marker pulses which serve as the basis for the measurement of the transmission characteristics of the outer sensor 86 are the first and last marker pulses 91 and 93, which are separated by a time $2a/V_o$.

The first reverberation pulse in sensor 87 occurs when the primary reflection pulse 92 reaches interface 90, generating a nonphase reversing reflection which traverses down rod 87 till it reaches the end, where it undergoes a phase reversing reflection at a time $2b/V_o$ after the initial reflection pulse 92. This first reverberation pulse is therefore positive and occurs at time $4b/V_o$. The second reverberation pulse of this second sensor occurs a period $2b/V_o$ later and is negative in polarity. Similarly, for the first sensor 86, the first reverberation pulse appears at time $4a/V_o$ and is positive, whereas the second reverberation pulse occurs a period $2a/V_o$ later and is negative.

In order then to be clearly identifiable as the second pulse from sensor 86, the reflection pulse 93 must occur at least a time $\tau$ later than reflection pulse 92 but must be separated by more than a time $\tau$ from the first negative reverberation pulse which occurs at a time $6b/V_o$ after the initial pulse of 91. Thus, the longer sensor in this embodiment must be at least $1/2V_o\tau$ longer than the shorter sensor but less than three times the length of the shorter sensor.

While the invention has been described specifically in terms of extensional mode waves, it should be noted that the important factor is that there be only one mode generated and that torsional mode waves, surface waves, Lamb waves, flexural, Love, or transverse shear waves may all be used, the particular wave choice being dictated by the type of sensor and the specific dimensions involved. The acoustical impedances will, of course, depend upon the wave modes, however, the relative values for the specific mode are the significant factors.

Having described the invention various modifications will now occur to those skilled in the art and the invention described should be construed as limited only by the spirit and scope of the appended claims.

I claim:

1. A system for determining over a range of ambient conditions, the values of said ambient conditions at two closely spaced sensors having acoustic transmission characteristics affected by said ambient conditions, comprising:

a transducer which generates pulses of ultrasonic energy primarily of specific length propagating in only one mode and which provides electrical output signals in response to received ultrasonic pulses;

a lead-in element acoustically coupled to said transducer;

first and second sensors acoustically coupled to said lead-in element, each of said sensors being defined by a pair of ultrasonic discontinuities, the relative acoustic impedances at said discontinuities being such that one of said discontinuities has an acoustic reflective coefficient of opposite polarity from the other, said sensor dimensions in the direction of propagation of said ultrasonic energy pulses being arranged so that in response to ultrasonic energy pulses applied to said sensors from said lead-in element reflection pulses are produced at each end of each sensor, said reflection pulses being separately identifiable as to their origin over the said range of ambient conditions on the basis of their polarity and location in time; and means electrically coupled to said transducer for identifying said reflection pulses on the basis of their polarity and location in time and measuring the difference in time or amplitude between pulses originating at the ends of said first sensor as indicative of the transmission characteristics of said first sensor and for measuring the difference in time or amplitude between pulses originating at the ends of said second sensor as indicative of the transmission characteristics of said second sensor.

2. A system in accordance with claim 1 wherein said first sensor has one end acoustically coupled to said lead-in element and said second sensor has one end acoustically coupled to the other end of said first sensor.

3. A system in accordance with claim 2 wherein the dimension of said first sensor in the direction of propagation of said ultrasonic energy pulses is greater than that of said second sensor by an amount at least equal to the length in that direction of each said generated ultrasonic pulse.

4. A system accordance with claim 2 wherein the dimension of said second sensor in the direction of propagation of said ultrasonic energy pulse is smaller than twice the dimension in the same direction of said first sensor by an amount greater than said pulse length in said same direction.

5. A system in accordance with claim 2 wherein said first sensor has an acoustic impedance smaller than said lead-in element and said second sensor has an impedance larger than said first sensor.

6. A system in accordance with claim 2 wherein said first sensor has an acoustic impedance smaller than said lead-in element and said second sensor has an acoustic impedance smaller than said first sensor and wherein the dimension of said second sensor in the direction of propagation of said ultrasonic energy pulse is greater than the dimension in the same direction of said first sensor.

7. A system in accordance with claim 1 wherein said first and second sensors each have one end coupled directly to the same end of said lead-in element.

8. A system in accordance with claim 7 wherein the dimension of said first sensor in the direction of propagation of said ultrasonic energy pulse differs from the dimension of said second sensor in the same direction by an amount greater than the length of said pulse in that direction.

9. A system in accordance with claim 7 wherein said first sensor is formed of a solid round cylindrical element of a first diameter less than the diameter of said lead-in element, said cylindrical element extending in the direction of propagation of said ultrasonic energy pulses and wherein said second sensor is a round cylindrical tubing element, the inner diameter of said tubing element being larger than said first diameter and the outer diameter of said tubing element being no greater than the diameter of said lead-in element, said second sensor extending in the direction of propagation of said ultrasonic energy pulses, the dimension of said first sensor in said direction differing from the dimension of said second sensor in that same direction.

10. A system for determining over a range of ambient conditions, the values of said ambient conditions at two closely spaced sensors having acoustic transmission characteristics affected by said ambient conditions, comprising:

a transducer which generates pulses of ultrasonic energy primarily of specific length propagating in only one mode and which provides electrical output signals in response to received ultrasonic pulses;

a lead-in element acoustically coupled to said transducer;

first and second sensors acoustically coupled to said lead-in element, the relative acoustic impedances of said sensors and said sensor dimensions in the direction of propagation of said ultrasonic energy pulses being arranged so that in response to ultrasonic energy pulses, applied to said sensors from said lead-in element reflection pulses are produced at each end of each sensor;

means for exciting said transducer to produce in a known sequence one pulse of ultrasonic energy characterized by a first wavelength and a second pulse of ultrasonic energy characterized by a substantially longer wavelength, said first sensor having acoustic impedance discontinuities with a dimension in the direction of propagation of said ultrasonic pulses less than said shorter pulse wavelength and said second sensor having acoustic impedance discontinuities with a dimension in the direction of propagation of said ultrasonic energy pulses less than said longer wavelength pulse generated by said transducer; and means electrically coupled to said transducer for identifying said reflection pulses and measuring the difference in time or amplitude between pulses originating at the ends of said first sensor as indicative of the transmission characteristics of said first sensor and for measuring the difference in time or amplitude between pulses originating at the ends of said second sensor as indicative of the transmission characteristics of said second sensor.

11. A system in accordance with claim 10 wherein said first and second sensors each have one end coupled directly to the same end of said lead-in member.

12. A system in accordance with claim 10 wherein one end of said first sensor is coupled to said lead-in member and one end of said second sensor is coupled to the other end of said first sensor.

13. A system in accordance with claim 12 wherein said first sensor is formed of a solid round cylindrical element of a first diameter extending in the direction of propagation having large diameter discs attached concentrically thereto extending in a direction normal to said direction of propagation, the thickness dimension of said discs in the direction of propagating being less than said first wavelength and wherein said second sensor extends generally in the direction of propagation and has a discontinuity at said one end which is an effective decrease in impedance to acoustic pulses propagated in both said first direction toward it or along said second sensor in the opposite direction toward it, whereby reflection pulses from the ends of said first sensor are of one polarity and reflection pulses from the ends of said second sensor are of opposite polarity.